(12) United States Patent
Akiyama et al.

(10) Patent No.: US 10,768,517 B2
(45) Date of Patent: Sep. 8, 2020

(54) LIGHT SOURCE DEVICE AND PROJECTOR

(71) Applicant: SEIKO EPSON CORPORATION, Tokyo (JP)

(72) Inventors: Koichi Akiyama, Matsumoto (JP); Akihiro Kashiwagi, Shiojiri (JP); Chigusa Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 123 days.

(21) Appl. No.: 15/556,239

(22) PCT Filed: Feb. 18, 2016

(86) PCT No.: PCT/JP2016/000881
§ 371 (c)(1),
(2) Date: Sep. 6, 2017

(87) PCT Pub. No.: WO2016/143274
PCT Pub. Date: Sep. 15, 2016

(65) Prior Publication Data
US 2018/0239228 A1    Aug. 23, 2018

(30) Foreign Application Priority Data

Mar. 9, 2015  (JP) ................................ 2015-045585
Dec. 11, 2015 (JP) ................................ 2015-241842

(51) Int. Cl.
*G03B 21/20*    (2006.01)
*H04N 9/31*     (2006.01)
(Continued)

(52) U.S. Cl.
CPC ......... *G03B 21/204* (2013.01); *G03B 21/006* (2013.01); *G03B 21/208* (2013.01);
(Continued)

(58) Field of Classification Search
CPC .............. G03B 21/006; G03B 21/2013; G03B 21/204; G03B 21/2066; G03B 21/2073;
(Continued)

(56) References Cited

U.S. PATENT DOCUMENTS 5,863,125 A * 1/1999 Doany ................. G02B 26/008
                                                          348/743
6,561,653 B2 * 5/2003 Belliveau ................ F21S 10/00
                                                          353/31
(Continued)

FOREIGN PATENT DOCUMENTS

CN    102223856 A    10/2011
CN    203217230 U    9/2013
(Continued)

OTHER PUBLICATIONS

Apr. 26, 2016 International Search Report issued in International Patent Application No. PCT/JP2016/000881.

*Primary Examiner* — Tsion Tumebo
(74) *Attorney, Agent, or Firm* — Oliff PLC

(57) ABSTRACT

A light source device includes: a light emission element; a condensing optical system on which a first component of light emitted from the light emission element is incident; an optical element on which the first component transmitted through the condensing optical system is incident; and a pickup optical system on which the first component having travelled via the optical element is incident. At least one of the condensing optical system and the pickup optical system includes a first lens formed of quartz.

13 Claims, 11 Drawing Sheets

(51) Int. Cl.
*G03B 21/28* (2006.01)
*G03B 21/00* (2006.01)

(52) U.S. Cl.
CPC ..... *G03B 21/2066* (2013.01); *G03B 21/2073* (2013.01); *G03B 21/28* (2013.01); *H04N 9/3105* (2013.01); *H04N 9/3158* (2013.01); *H04N 9/3161* (2013.01); *H04N 9/3164* (2013.01); *G03B 21/2013* (2013.01)

(58) Field of Classification Search
CPC .... G03B 21/208; G03B 21/28; H04N 9/3105; H04N 9/3161
See application file for complete search history.

(56) References Cited

U.S. PATENT DOCUMENTS

| | | | |
|---|---|---|---|
| 6,687,196 B1* | 2/2004 | Ueyanagi | G11B 7/0937 369/112.24 |
| 6,688,756 B1 | 2/2004 | Akiyama | |
| 6,751,175 B1* | 6/2004 | Maeda | G11B 7/0956 369/112.01 |
| 7,012,876 B2* | 3/2006 | Hendriks | G02B 7/008 369/112.23 |
| 8,179,768 B2* | 5/2012 | Tanaka | G11B 7/1378 369/112.24 |
| 8,483,034 B2* | 7/2013 | Wada | G11B 7/0956 369/112.23 |
| 2002/0136147 A1* | 9/2002 | Matsui | G11B 7/1369 369/112.24 |
| 2002/0154275 A1* | 10/2002 | Ozawa | G03B 21/005 353/31 |
| 2003/0025886 A1* | 2/2003 | Okuyama | H04N 9/3141 353/100 |
| 2003/0086156 A1* | 5/2003 | McGuire, Jr. | G03F 7/70075 359/352 |
| 2003/0147157 A1* | 8/2003 | Kamimura | C03C 3/089 359/831 |
| 2004/0001186 A1* | 1/2004 | Yamamoto | G03B 21/005 353/31 |
| 2004/0012734 A1* | 1/2004 | Yamanaka | G02B 3/0056 349/95 |
| 2004/0036961 A1* | 2/2004 | McGuire, Jr. | G02B 17/0892 359/344 |
| 2004/0174595 A1* | 9/2004 | Koide | G03B 21/2073 359/489.07 |
| 2004/0256746 A1* | 12/2004 | Kitabayashi | G02B 27/1013 264/1.31 |
| 2006/0097205 A1* | 5/2006 | Kakuchi | G03F 7/706 250/548 |
| 2007/0132954 A1 | 6/2007 | Yanai et al. | |
| 2007/0188879 A1* | 8/2007 | Ikezawa | G03F 7/70341 359/649 |
| 2008/0013415 A1* | 1/2008 | Nomura | G11B 7/1374 369/44.23 |
| 2009/0051833 A1* | 2/2009 | Watanabe | G02B 3/0056 349/8 |
| 2009/0129242 A1* | 5/2009 | Katsuma | G11B 7/1374 369/112.23 |
| 2009/0129243 A1* | 5/2009 | Katsuma | G11B 7/1374 369/112.23 |
| 2009/0161033 A1* | 6/2009 | Kaise | G03B 21/2013 349/8 |
| 2009/0284838 A1* | 11/2009 | Sudo | G03B 21/208 359/622 |
| 2010/0085631 A1* | 4/2010 | Kusukame | G02F 1/3525 359/328 |
| 2010/0131060 A1 | 5/2010 | Simpson et al. | |
| 2010/0165299 A1* | 7/2010 | Shimizu | G03B 21/28 353/31 |
| 2012/0106126 A1* | 5/2012 | Nojima | G02B 26/008 362/84 |
| 2012/0127435 A1 | 5/2012 | Kitano et al. | |
| 2012/0133903 A1* | 5/2012 | Tanaka | G03B 21/204 353/31 |
| 2012/0163155 A1* | 6/2012 | Hayashi | G11B 7/1376 369/112.23 |
| 2012/0170005 A1* | 7/2012 | Saitou | G03B 21/206 353/69 |
| 2013/0088471 A1 | 4/2013 | Kitano | |
| 2013/0229628 A1* | 9/2013 | Akiyama | G03B 21/2073 353/20 |
| 2013/0321718 A1* | 12/2013 | Huang | H04N 13/32 349/5 |
| 2014/0268063 A1* | 9/2014 | Akiyama | G03B 21/204 353/20 |
| 2014/0293232 A1* | 10/2014 | Tanaka | G03B 21/204 353/20 |
| 2015/0029468 A1* | 1/2015 | Kurata | G03B 21/2026 353/52 |
| 2015/0153020 A1 | 6/2015 | Akiyama | |
| 2015/0301438 A1 | 10/2015 | Akiyama et al. | |
| 2016/0011497 A1 | 1/2016 | Akiyama | |
| 2016/0062223 A1 | 3/2016 | Akiyama | |
| 2016/0259234 A1 | 9/2016 | Akiyama | |

FOREIGN PATENT DOCUMENTS

| | | |
|---|---|---|
| JP | 2007-163726 A | 6/2007 |
| JP | 2012-103615 A | 5/2012 |
| JP | 2012-108486 A | 6/2012 |
| JP | 2013-073081 A | 4/2013 |
| JP | 2013-092752 A | 5/2013 |
| JP | 2015-031925 A | 2/2015 |
| JP | 2015-049442 A | 3/2015 |
| JP | 2015-087423 A | 5/2015 |
| JP | 2015-106130 A | 6/2015 |
| JP | 2015-121606 A | 7/2015 |
| JP | 2015-135436 A | 7/2015 |
| JP | 2015-203857 A | 11/2015 |
| JP | 2016-018111 A | 2/2016 |
| JP | 2016-018112 A | 2/2016 |
| JP | 2016-051013 A | 4/2016 |
| JP | 2016-109849 A | 6/2016 |
| JP | 2016-142983 A | 8/2016 |
| JP | 2016-162575 A | 9/2016 |

* cited by examiner

LIGHT SOURCE DEVICE AND PROJECTOR

BACKGROUND

1. Technical Field

The present invention relates to a light source device and a projector in which the light source device is used.

2. Related Art

Light source devices in which solid-state light sources are used have been proposed as light source devices for projectors as described in JP-A-2012-108486 (Document 1).

In a light source device of Document 1, a P-polarized component in blue light emitted from a solid-state light source is transmitted through a dichroic mirror. The blue light transmitted through the dichroic mirror is condensed to a phosphor by a condensing lens. A part of the blue light is converted into fluorescent light in the phosphor and the blue light not converted into the fluorescent light is reflected toward the dichroic mirror. Since a phase difference plate is provided between the dichroic mirror and the phosphor, the blue light entering again the dichroic mirror has been converted into S-polarized light. The S-polarized blue light is reflected along with the fluorescent light toward an illumination object by the dichroic mirror.

However, when power of the solid-state light source is increased, the intensity of the blue light reflected toward the illumination object by the dichroic mirror decreases, and thus a problem arises in that use efficiency of the blue light decreases.

SUMMARY

The invention is devised in view of the foregoing circumstances and an object of the invention is to provide a light source device with high light use efficiency and a projector in which the light source device is incorporated.

To achieve the foregoing object, according to the invention, a light source device includes: a light emission element; a condensing optical system on which a first component of light emitted from the light emission element is incident; an optical element on which the first component transmitted through the condensing optical system is incident; and a pickup optical system on which the first component having travelled via the optical element is incident. At least one of the condensing optical system and the pickup optical system includes a first lens formed of quartz. Here, the condensing optical system and the pickup optical system may be different systems or the same system.

In the present description, the first component is referred to as a first light. Examples of the optical element include a diffusion reflection element and a transmissive diffusion element.

In the light source device, the first lens is formed of quartz with small internal absorption and a small coefficient of thermal expansion. Therefore, self-heating by light absorption is less likely to occur in the first lens. Even when the temperature of the first lens increases by the light absorption, birefringence occurring due to thermal distortion of the first lens does not increase excessively. Therefore, the polarization state of light transmitted through the condensing optical system is less likely to change and it is possible to reduce loss by a polarization separation element or the like. Therefore, high light use efficiency is obtained.

In terms of a specific aspect or viewpoint of the light source device according to the aspect of the invention, the optical element may include a reflection surface from which the first component is reflected. The first component reflected from the reflection surface may be incident on the pickup optical system. In this way, even when the optical element is a reflection element, high light use efficiency is obtained.

According to another aspect of the invention, the light source device may further include: a polarization separation element that is provided on a light path between the light emission element and the condensing optical system; and a phase difference element that is provided on a light path between the polarization separation element and the condensing optical system and receives the first component of the light having travelled via the polarization separation element. The condensing optical system also serves as the pickup optical system. The first component reflected from the reflection surface is transmitted through the pickup optical system and the phase difference element to be incident on the polarization separation element. In this way, even when the polarization separation element is used, high light use efficiency is obtained.

According to still another aspect of the light source device of the invention, at least one lens surface among a plurality of lens surfaces of the condensing optical system and the pickup optical system may be an aspheric surface with a negative conic constant. In the aspheric lens with the negative conic constant, power is weakened toward the circumference of the lens surface. Therefore, even when the condensing optical system is configured as a relatively thick lens, it is relatively easy to correct spherical aberration. Accordingly, it is possible to take out the first component to an illuminated side in a small disturbance state.

According to still another aspect of the invention, the first lens may be disposed at a position closest to the phase difference element in the condensing optical system. The first lens may have an aspheric surface with a negative conic constant on a side of the phase difference element and have a curve surface with a radius of curvature of 1000 mm or more or a planar surface on a side facing away from the phase difference element. In this case, in a case in which the opposite surface to the aspheric surface of the first lens is a convex surface, the curvature of the convex surface is small. Therefore, it is possible to decrease a gap between the first lens and an element (for example, a lens or a reflection element) on the side of the reflection element. Therefore, it is possible to prevent an increase in the size of the first lens which increase may be caused by an increase in the diameter of light incident on the first lens from the side of the reflection element.

According to still another aspect of the invention, the condensing optical system may further include a second lens disposed at a position closest to the optical element in the condensing optical system. The second lens is formed of quartz. A lens surface of the second lens on a side of the optical element may be a curve surface with a radius of curvature of 1000 nm or more or a planar surface. In this case, in a case in which the lens surface of the second lens is a convex surface, the radius of curvature of the convex surface is small. Therefore, it is possible to decrease a gap between the second lens and a reflection element in the circumference of the second lens. Therefore, it is possible to prevent an increase in the size of the first lens which increase may be caused by an increase in the diameter of light incident on the second lens.

According to still another aspect of the invention, the first lens may be disposed at a position closest to the reflection element in the condensing optical system.

According to still another aspect of the invention, the condensing optical system may further include a third lens disposed at a position closest to the phase difference element in the condensing optical system. A photoelastic constant of the third lens may be less than a photoelastic constant of the first lens. In this case, the third lens is formed of a glass material other than quartz. However, the photoelastic constant of the third lens is less than the photoelastic constant of the first lens. Therefore, even when the third lens thermally expands, birefringence does not increase excessively. Therefore, high light use efficiency can be obtained.

According to still another aspect of the invention, the third lens may have an aspheric surface with a negative conic constant on a side of the phase difference element. In this configuration, since aberration can be corrected by the second lens, it is possible to take out the first component to an illumination object side in a small disturbance state.

According to still another aspect of the invention, the condensing optical system may further include a fourth lens adjacent to the first lens. The fourth lens may be formed of quartz.

According to still another aspect of the invention, the light source device may further include a wavelength conversion element that emits color light with a different wavelength from the first component. In this configuration, it is possible to radiate the light containing a plurality of pieces of color light to an illumination object side.

To achieve the foregoing object, according to the invention, a projector includes: the foregoing light source device; a light modulation device that modulates light emitted from the light source device, in accordance with image information, to form image light; and a projection optical system that projects the image light.

Since the light source device with high light use efficiency is used in the projector, a bright image can be projected with high efficiency.

DESCRIPTION OF EXEMPLARY EMBODIMENTS

Figure 1:
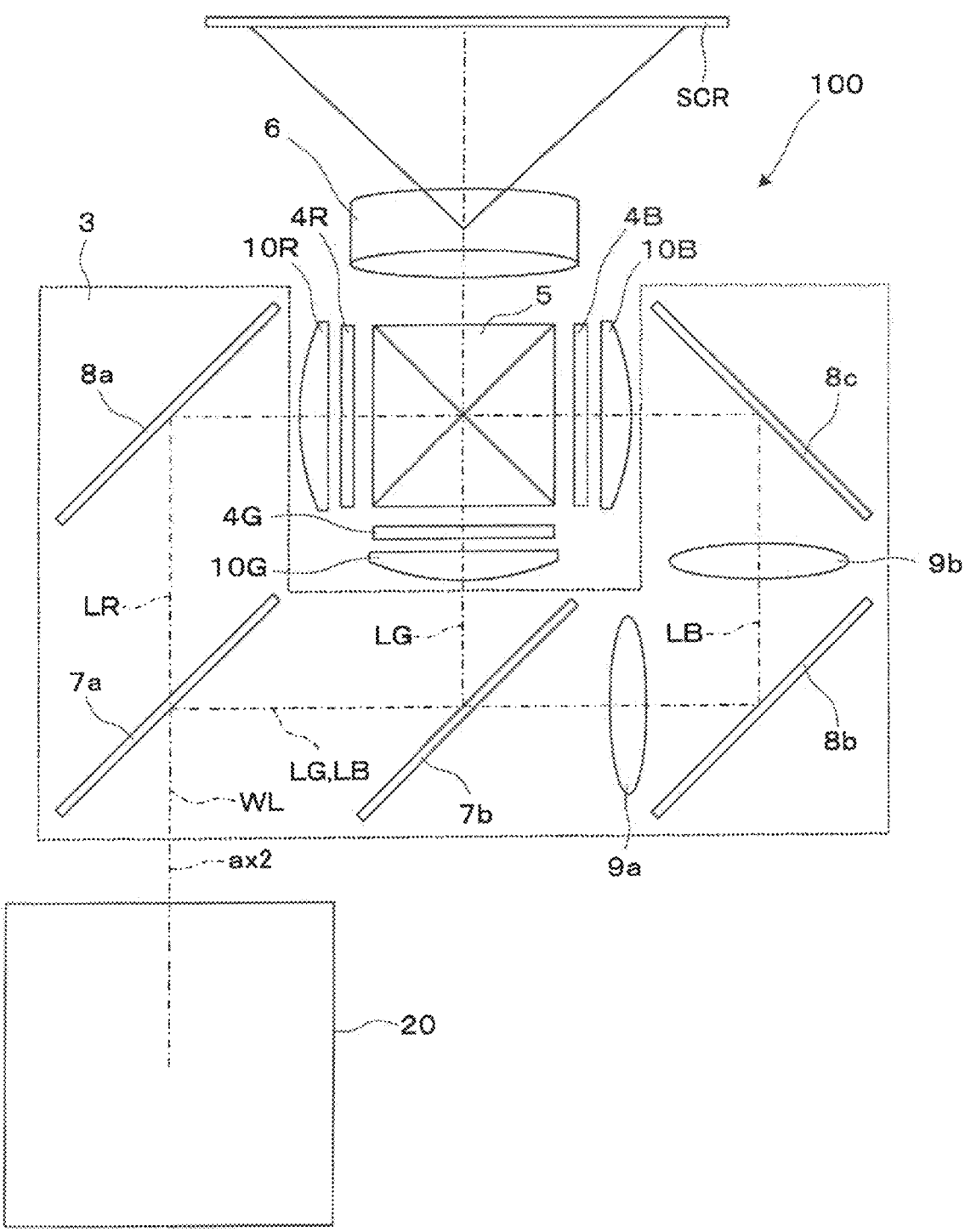
FIG. 1 is a plan view illustrating a schematic configuration of a projector according to an embodiment.

Hereinafter, a specific embodiment of the invention will be described in detail with reference to the drawings. In the drawings used for description, to facilitate understanding of features, feature portions are enlarged for convenience in some cases, and thus ratios of the dimensions of constituent elements are not limited to being the same as the actual ratios.

FIG. 1 is a plan view illustrating a schematic configuration of a projector. A projector 100 includes an illumination device 20, a color separation optical system 3, a light modulation device 4R, a light modulation device 4G, a light modulation device 4B, a combination optical system 5, and a projection optical system 6.

The color separation optical system 3 separates illumination light WL emitted from the illumination device 20 into red light LR, green light LG, and blue light LB. The color separation optical system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the illumination device 20 into the red light LR and light including the green light LG and the blue light LB. The first dichroic mirror 7a transmits the red light LR and reflects the green light LG and the blue light LB. The second dichroic mirror 7b reflects the green light LG and transmits the blue light LB.

The first total reflection mirror 8a is disposed on a light path of the red light LR and reflects the red light LR transmitted through the first dichroic mirror 7a toward the light modulation device 4R. On the other hand, the second total reflection mirror 8b and the third total reflection mirror 8c are disposed on a light path of the blue light LB and guide the blue light LB transmitted through the second dichroic mirror 7b to the light modulation device 4B. The green light LG is reflected from the second dichroic mirror 7b to the light modulation device 4G.

The first relay lens 9a and the second relay lens 9b are disposed on a light incidence side and a light emission side of the second total reflection mirror 8b on the light path of the blue light LB. The first relay lens 9a and the second relay lens 9b have a function of compensating for light loss of the blue light LB caused due to a longer light path length of the blue light LB than a light path length of the red light LR or the green light LG.

The light modulation device 4R modulates the red light LR according to image information to form image light corresponding to the red light LR. The light modulation device 4G modulates the green light LG according to image information to form image light corresponding to the green light LG. The light modulation device 4B modulates the blue light LB according to image information to form image light corresponding to the blue light LB.

For example, a transmissive liquid crystal panel is used for the light modulation device 4R, the light modulation device 4G, and the light modulation device 4B. A polarization plate (not illustrated) is disposed on each of the incidence side and the emission side of the liquid crystal panel.

A field lens 10R, a field lens 10G, and a field lens 10B are disposed on the incident sides of the light modulation device 4R, the light modulation device 4G, and the light modulation device 4B, respectively. The field lens 10R, the field lens 10G, and the field lens 10B parallelize the red light LR, the green light LG, and the blue light LB incident on the light modulation device 4R, the light modulation device 4G, and the light modulation device 4B, respectively.

The pieces of image light corresponding to the colors from the light modulation device 4R, the light modulation device 4G, and the light modulation device 4B are incident on the combination optical system 5. The combination optical system 5 combines the pieces of image light corresponding to the red light LR, the green light LG, and the blue light LB and emits the combined image light to the projection optical system 6. For example, a cross dichroic prism is used for the combination optical system 5.

The projection optical system 6 is formed of a projection lens group and enlarges the image light combined by the combination optical system 5 to project the image light toward a screen SCR. Thus, an enlarged color video is displayed on the screen SCR.

The illumination device 20 will be described with reference to FIG. 2. The illumination device 20 includes a light source device 2, an integrator optical system 31, a polarization conversion element 32, and a superimposing optical system 33. The light source device 2 includes an array light source 21, a collimator optical system 22, an afocal optical system 23, a first phase difference element 51, a homogenizer optical system 24, a polarization separation element 25, a first condensing optical system 26, a phosphor layer 27, a second phase difference element 28, a second condensing optical system 29, and a diffusion reflection element 30. The second phase difference element 28 is equivalent to a phase difference element in the claims, the diffusion reflection element 30 is equivalent to an optical element in the claims, and the second condensing optical system 29 is equivalent to a condensing optical system in the claims. The second condensing optical system 29 also serves as a pickup optical system.

In the illumination device 20, the array light source 21, the collimator optical system 22, the afocal optical system 23, the first phase difference element 51, the homogenizer optical system 24, the polarization separation element 25, the second phase difference element 28, the second condensing optical system 29, and the diffusion reflection element 30 are disposed sequentially along an optical axis ax1. The phosphor layer 27, the first condensing optical system 26, the polarization separation element 25, the integrator optical system 31, the polarization conversion element 32, the superimposing optical system 33 are disposed sequentially along an optical axis ax2. The optical axis ax1 and the optical axis ax2 are orthogonal to each other on the same plane.

The array light source 21 includes a plurality of semiconductor lasers (light emission elements) 21a. The plurality of semiconductor lasers 21a are disposed in an array shape inside a plane P1 orthogonal to the optical axis ax1.

Each semiconductor laser 21a emits the blue light BL. The semiconductor laser 21a emits laser light with a peak wavelength of, for example, 455 nm as the blue light BL. The blue light BL emitted from the semiconductor laser 21a turns into S-polarized light with respect to the polarization separation element 25 to be described below. A part of the blue light BL is used as blue light for illumination and the other part of the blue light BL is used as excited light to excite the phosphor layer 27 and generate yellow fluorescent light.

The semiconductor laser 21a is not limited to a semiconductor laser that emits light with a single wavelength, but may be replaced with a plurality of semiconductor lasers that emit light with different wavelengths. In this case, a semiconductor laser that emits laser light with a wavelength of, for example, 460 nm as the blue light for illumination may be used and a semiconductor laser that emits laser light with a wavelength of, for example, 440 nm as the blue light for excitation may be used.

The blue light BL is emitted from the array light source 21 to the polarization separation element 25 and is first incident on the collimator optical system 22.

The collimator optical system 22 converts each blue light BL emitted from the array light source 21 into a parallel ray. The collimator optical system 22 is configured to include a plurality of collimator lenses 22a disposed along a plane orthogonal to the optical axis ax1. The plurality of collimator lens 22a are disposed in, for example, an array shape to correspond to the semiconductor lasers 21a that form the array light source 21, respectively.

The blue light BL converted into the parallel ray by the collimator optical system 22 is incident on the afocal optical system 23. The afocal optical system 23 adjusts a ray diameter of the blue light BL. The afocal optical system 23 is configured to include, for example, a convex lens 23a and a concave lens 23b.

The blue light BL with the ray diameter adjusted by the afocal optical system 23 is transmitted through the first phase difference element 51 and is further incident on the homogenizer optical system 24. The first phase difference element 51 is, for example, a ½-wavelength plate. The first phase difference element 51 is appropriately rotated to convert the blue light BL which is S-polarized light into the blue light BL containing an S-polarized component and a P-polarized component. A ¼-wavelength plate may be used as the first phase difference element 51.

The homogenizer optical system 24 is configured to include a first multi-lens array 24a and a second multi-lens array 24b. The multi-lens array 24a includes a plurality of small lenses that divide the blue light BL into pencils of light.

The blue light BL transmitted through the homogenizer optical system 24 is incident on the polarization separation element 25. The polarization separation element 25 is inclined to form an angle of 45° with respect to the optical axis ax1 and the optical axis ax2.

A polarization separation layer 25a that has wavelength selectivity is provided on one surface of the polarization separation element 25. The polarization separation element 25 separates the blue light BL into blue P-polarized light $BL_P$ which is a first light and blue S-polarized light $BL_S$ which is a second light. The polarization separation element 25 reflects the blue S-polarized light $BL_S$ as excited light toward the phosphor layer 27 and transmits the blue P-polarized light $BL_P$ through the diffusion reflection element 30.

The polarization separation element 25 has a color separation function of transmitting fluorescent light YL with a different wavelength from the blue light BL irrespective of its polarization state.

The blue S-polarized light $BL_S$ emitted in a state close to a parallel light flux from the polarization separation element 25 is incident on the first condensing optical system 26. The first condensing optical system 26 condenses the blue S-polarized light $BL_S$ toward the phosphor layer 27. The first condensing optical system 26 homogenizes the distribution of illuminance by the blue S-polarized light $BL_S$ on the phosphor layer 27 in cooperation with the homogenizer optical system 24.

The first condensing optical system 26 is configured to include, for example, pickup lenses 26a and 26b. The blue S-polarized light $BL_S$ for excitation is condensed on the phosphor layer 27 which is a wavelength conversion element by the first condensing optical system 26.

The phosphor layer 27 is provided in a circular shape on a board 36a. The board 36a is held by a rotation mechanism 36 and is rotated about a rotation axis. The phosphor layer 27 converts the blue S-polarized light $BL_S$ with the wavelength of 455 nm which is excited light into the fluorescent light (yellow light) YL with a peak wavelength in a wavelength bandwidth of, for example, 500 to 700 nm and emits the fluorescent light YL. The fluorescent light YL is a third light with a different wavelength from the blue S-polarized light $BL_S$.

A reflection unit 37 is provided between the phosphor layer 27 and the board 36a. The reflection unit 37 reflects the fluorescent light YL generated in the phosphor layer 27.

Among the fluorescent light YL generated in the phosphor layer 27, a part of the fluorescent light YL is reflected toward the first condensing optical system 26 by the reflection unit 37. Of the fluorescent light YL generated in the phosphor layer 27, the other part of the fluorescent light YL is emitted toward the first condensing optical system 26 without being involved in the reflection unit 37. In this way, the fluorescent light YL is emitted from the phosphor layer 27 to the side of the first condensing optical system 26.

The fluorescent light YL emitted from the phosphor layer 27 is nonpolarized light. The fluorescent light YL passes through the first condensing optical system 26 and is subsequently incident as a substantially parallel light flux on the polarization separation element 25. Then, the fluorescent light YL is transmitted through the integrator optical system 31 from the polarization separation element 25.

The blue P-polarized light $BL_P$ emitted in the state close to the parallel light flux from the polarization separation element 25 is incident on the second phase difference element 28. The second phase difference element 28 is a ¼-wavelength plate (λ/4 plate) disposed on a light path between the polarization separation element 25 and the diffusion reflection element 30. Accordingly, the blue P-polarized light $BL_P$ emitted from the polarization separation element 25 enters the second phase difference element 28 to be converted into blue light BL which is circularly polarized light, and subsequently enters the second condensing optical system 29.

The second condensing optical system 29 is formed of one or more lenses and includes a lens formed of fused quartz. Hereinafter, a lens formed of fused quartz is referred to as a quartz lens. The second condensing optical system 29 includes a first pickup lens 29a that has positive power and a relatively large diameter, a second pickup lens 29b that has positive power, and a third pickup lens 29c that has positive power and a relatively small diameter. The first pickup lens 29a is disposed at a farthest position from the diffusion reflection element 30 (a position closest to the second phase difference element 28) inside the second condensing optical system 29. The third pickup lens 29c is disposed at a closest position (a closest side) to the diffusion reflection element 30 within the second condensing optical system 29. The number of lenses that form the second condensing optical system 29 is not limited to 3.

The second condensing optical system 29 condenses the blue light $BL_C$ on the diffusion reflection element 30. The second condensing optical system 29 homogenizes the distribution of illuminance by the blue light $BL_C$ on the diffusion reflection element 30 in cooperation with the homogenizer optical system 24.

The diffusion reflection element 30 diffuses and reflects the blue light $BL_C$ incident from the second condensing optical system 29 toward the polarization separation element 25. The diffusion reflection element 30 preferably has a property in which linearly polarized light incident vertically is reflected as linearly polarized light.

The blue light $BL_C$ diffused and reflected by the diffusion reflection element 30 passes through the second condensing optical system 29 in an opposite direction to be converted into substantially parallel light flux. The blue light $BL_C$ having passed through the second condensing optical system 29 in the opposite direction is converted into blue S-polarized light $BL_{S2}$ which is S-polarized light by the second phase difference element 28, and subsequently enters the polarization separation element 25. Then, the blue S-polarized light $BL_{S2}$ is reflected as blue S-polarized light $BL_{S3}$ from the polarization separation element 25 toward the integrator optical system 31.

Thus, the blue S-polarized light $BL_{S3}$ is used as the illumination light WL along with the fluorescent light YL transmitted through the polarization separation element 25. That is, the blue S-polarized light $BL_{S3}$ and the fluorescent light YL are emitted in the same direction from the polarization separation element 25. Thus, it is possible to obtain the white illumination light WL in which the blue S-polarized light $BL_{S3}$ and the fluorescent light (yellow light) YL are mixed.

The illumination light WL emitted from the polarization separation element 25 is incident on the integrator optical system 31. The integrator optical system 31 is configured to include, for example, lens arrays 31a and 31b. The lens arrays 31a and 31b are each configured in such manner that a plurality of lenses are arranged in an array shape.

The illumination light WL transmitted through the integrator optical system 31 is incident on the polarization conversion element 32. The polarization conversion element 32 is configured to include a polarization separation film and a phase difference plate. The polarization conversion element 32 converts the illumination light WL into linearly polarized light.

The illumination light WL emitted from the polarization conversion element 32 is incident on the superimposing optical system 33. The superimposing optical system 33 homogenizes the distribution of illuminance by the illumination light WL in an illuminated region in cooperation with the integrator optical system 31. In this way, the illumination device 20 generates the illumination light WL.

In the foregoing description, the ideal case has been described. That is, the case in which the blue light $BL_C$ returned from the diffusion reflection element 30 is converted into S-polarized light by the second phase difference element 28 has been described. In this case, the amount of blue S-polarized light $BL_{S3}$ is expected to be substantially the same as the amount of blue S-polarized light $BL_{S2}$. However, actually, the amount of blue S-polarized light $BL_{S3}$ is less than the amount of blue S-polarized light $BL_{S2}$. This tendency is considerable when power of the semiconductor laser 21a is large.

The glass material of the lens has internal absorptance which is not zero. Therefore, it is considered that the lenses that form the second condensing optical system 29 absorb a part of the laser light emitted from the array light source 21 to be locally heated. Accordingly, the inventors carried out a simulation focusing on the local heating of the second condensing optical system 29 due to incidence of light with high intensity on the second condensing optical system 29 as a cause to reduce the amount of blue S-polarized light $BL_{S3}$.

Figure 3:
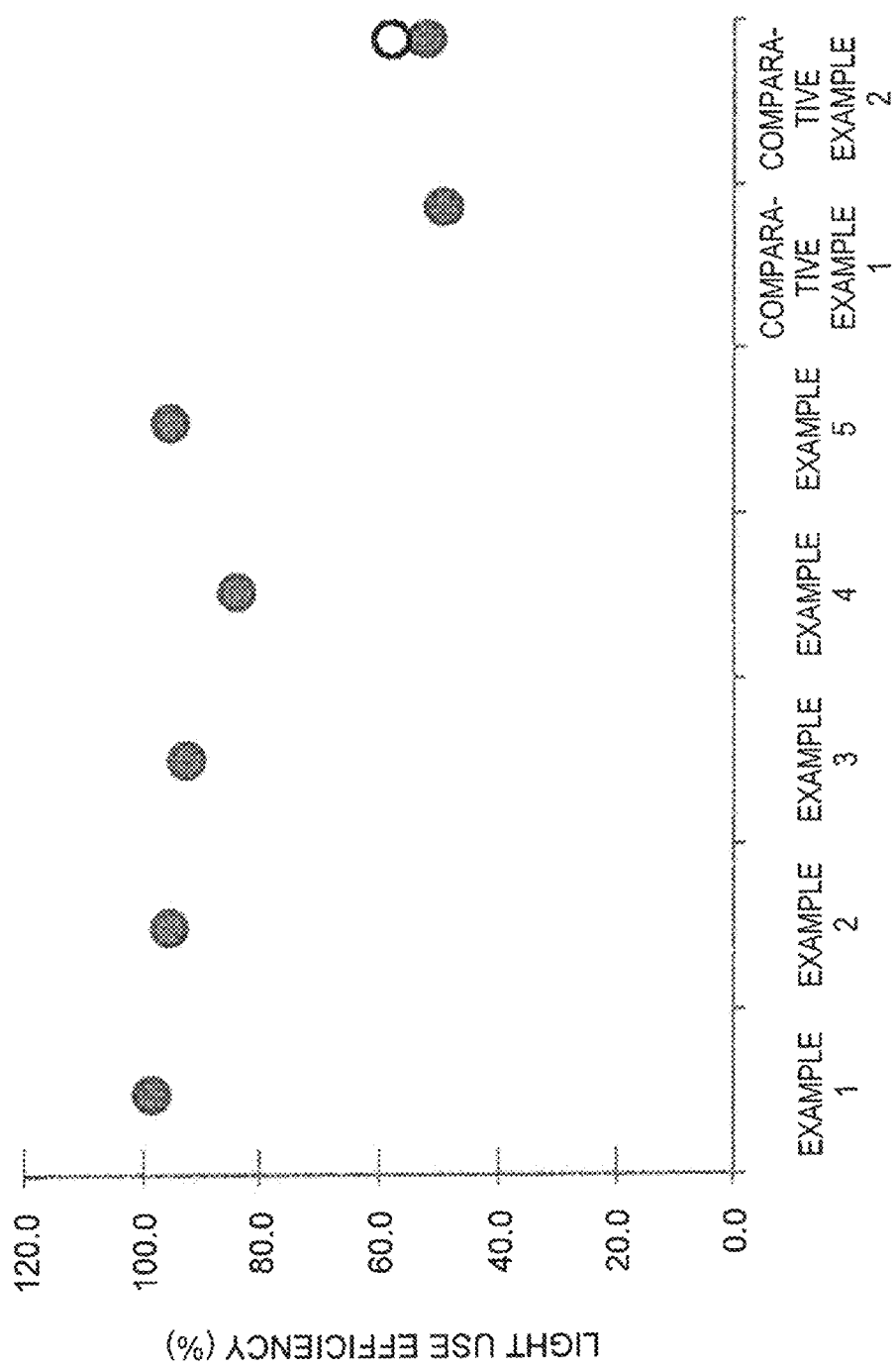
FIG. 3 is a diagram illustrating a relation between a glass material of a lens and light use efficiency.

FIG. 3 illustrates simulation results and experimental values indicating relations between the glass material of each lens of the second condensing optical system 29 and light use efficiency. The light use efficiency is indicated with reference to the amount of blue S-polarized light $BL_{S3}$ obtained with the second condensing optical system 29 having no birefringence. Hereinafter, the first pickup lens 29a, the second pickup lens 29b, and the third pickup lens 29c are referred to as lenses G1, G2, and G3, respectively. In the simulation, distortion and stress were first calculated based on heating in the lenses G1, G2, and G3 when the circularly polarized blue light $BL_C$ is incident on the second condensing optical system 29. Next, birefringence caused by a photoelastic effect was calculated based on a stress distribution. Then, the polarization state of the blue S-polarized light $BL_{S2}$ was calculated to obtain the amount of blue S-polarized light $BL_{S3}$ that can be used for illumination.

In Table 1, glass materials used in the simulation are collectively indicated.

TABLE 1

|  | Example 1 | Example 2 | Example 3 | Example 4 | Example 5 | Comparative Example 1 | Comparative Example 2 |
|---|---|---|---|---|---|---|---|
| G1 | Quartz | S-BAL35 | Quartz | S-BAL35 | S-BAL35 | S-FPM2 | S-BAL35 |
| G2 | Quartz | Quartz | Quartz | S-LAL12 | Quartz | S-FPM2 | S-LAL12 |
| G3 | Quartz | Quartz | S-LAH66 | Quartz | Quartz | S-FPM2 | S-LAH66 |

As shown in Table 1, in Example 1, the lenses G1, G2, and G3 that form the second condensing optical system 29 are all quartz lenses.

In Example 2, a glass material of the lens G1 is S-BAL35 and the lenses G2 and G3 are quartz lenses.

In Example 3, the lenses G1 and G2 are quartz lenses and a glass material of the lens G3 is S-LAH66.

In Example 4, a glass material of the lens G1 is S-BAL35, a glass material of the lens G2 is S-LAL12, and the lens G3 is a quartz lens.

In Example 5, glass materials of the lenses are the same as those of Example 2. A difference from Example 2 is that the lens G3 is cooled.

In Comparative Example 1, glass materials of the lenses G1, G2, and G3 are all S-FPM2.

In Comparative Example 2, a glass material of the lens G1 is S-BAL35, a glass material of the lens G2 is S-LAL12, and a glass material of the lens G3 is S-LAH66.

The foregoing glass materials other than quartz are all made by OHARA INC. Table 2 shows optical characteristics of glass materials usable in the lenses. A unit of a photoelastic constant is $nm/cm/10^5$ Pa. Table 2 shows internal transmissivity instead of internal absorptance.

TABLE 2

| Material | $\lambda = 440$ nm, internal transmissivity ($\tau = 10$ mm) | Photoelastic constant | Coefficient of thermal expansion | Refractive index |
|---|---|---|---|---|
| Fused quartz | 0.9999 | 3.47 | $5.5 \times 10^{-7}$ | 1.45840 |
| FCD515 | 0.991 | 0.52 | $134 \times 10^{-7}$ | 1.59282 |
| FCD505 | 0.989 | 0.41 | $140 \times 10^{-7}$ | 1.59282 |
| S-FPM2 | 0.989 | 0.51 | $135 \times 10^{-7}$ | 1.59522 |
| S-LAH66 | 0.991 | 1.43 | $74 \times 10^{-7}$ | 1.77250 |
| S-LAL14 | 0.993 | 1.86 | $71 \times 10^{-7}$ | 1.69680 |
| L-BAL35 | 0.993 | 2.29 | $81 \times 10^{-7}$ | 1.58913 |
| S-BSL7 | 0.995 | 2.79 | $86 \times 10^{-7}$ | 1.51633 |
| S-LAL12 | 0.994 | 1.61 | $86 \times 10^{-7}$ | 1.67790 |
| S-BAL35 | 0.995 | 2.15 | $67 \times 10^{-7}$ | 1.58913 |

In FIG. 3, filled circles indicate simulation results and open circles indicate actually measured values corresponding to Comparative Example 2. The simulation results are in good agreement with experimental values.

The simulation shows that light use efficiencies of 80% or more were obtained in Examples 1 to 5 whereas merely about 50% is obtained in Comparative Examples 1 and 2.

For example, in S-FPM2 used in Comparative Example 1, a photoelastic constant is small and internal absorptance and a coefficient of thermal expansion are large compared with those of fused quartz. Therefore, a lens formed of S-FPM2 is expected to expand more than a quartz lens due to self-heating caused by light absorption. The expansion causes stress, and consequently birefringence occurs in the lens due to the photoelastic effect. In this case, the circularly polarized blue light $BL_C$ having entered the second condensing optical system 29 from the second phase difference element 28 is converted into elliptically polarized blue light $BL_C$ by the second condensing optical system 29. The polarization state of the elliptically polarized blue light $BL_C$ reflected by the diffusion reflection element 30 is further disturbed by the second condensing optical system 29. The elliptically polarized blue light BL remains elliptically polarized light even after the elliptically polarized blue light $BL_C$ travels backward from the diffusion reflection element 30 and passes through the second phase difference element 28. Therefore, the elliptically polarized blue light $BL_C$ includes a P-polarized component which cannot be reflected from the polarization separation element 25. Only the S-polarized component which can be reflected from the polarization separation element 25 is used as the blue S-polarized light $BL_{S3}$. In this way, the light absorption by the second condensing optical system 29 is considered to reduce the light use efficiency.

On the other hand, the fused quartz has internal absorptance of 0.1% (thickness $\tau = 10$ mm) or less in the wavelength of the blue light BLC and about 1/50 of the internal absorptance of typical optical glass. Therefore, even when strong light enters, heating is less likely to occur. The fused quartz has a coefficient $\alpha$ of thermal expansion of $10 \times 10^{-7}$ (/° C.) or less, which is approximately 1/10 of the coefficient $\alpha$ of thermal expansion of the typical optical glass. Therefore, even when temperature increases, distortion is less likely to occur. Though the photoelastic constant of the fused quartz is 3.47, the internal absorptance and the coefficient $\alpha$ of thermal expansion are less than those of a typical glass material. Therefore, even when temperature increases, thermal distortion is less likely to increase. That is, since birefringence is less likely to increase, a polarization state of light passing through the quartz lens is less likely to be changed.

Actually, in Comparative Examples 1 and 2 in which no quartz lens is used, high light use efficiencies are not obtained. However, in Examples 1 to 5, each of which includes the second condensing optical system 29 having a quartz lens, light use efficiency of 80-% or more is obtained. In Example 1 in which the lenses G1, G2, and G3 are quartz lenses, light use efficiency of nearly 100% is obtained. When Example 2 is compared to Example 5, it can be understood that light use efficiency increases when the lens G3 is cooled. This is because the birefringence decreases through the cooling.

As described above, configuring the second condensing optical system 29 with at least one quartz lens having small internal absorptance shows that a reduction in light absorption which is one cause of the birefringence is effective to improve the light use efficiency.

As understood from Examples 2 and 4, the lens G1 may not be a quartz lens. This is because an amount of heat generated in the lens G1 is small since concentration of the blue light $BL_C$ incident on the lens G1 is low and light density of the light transmitted through the lens G1 is low. The photoelastic constant of the glass material of the lens G1 is preferably less than the photoelastic constant of the fused quartz.

To obtain high light use efficiency, all of the lenses that form the second condensing optical system are most preferably configured as quartz lenses. However, in terms of cost, the lenses G2 and G3 disposed at positions at which the concentration of the blue light $BL_C$ is relatively high may be configured as quartz lenses. Alternatively, only the lens G3 disposed at a position at which the concentration of the blue light $BL_C$ is the highest may be configured as a quartz lens.

As understood from Example 3, a glass material of which a photoelastic constant and a coefficient of thermal expansion are relatively small may be used as the glass material of the lens G3 instead of the fused quartz.

Next, the lens surfaces that form a second condensing optical system according to Examples 6 to 12 will be described with reference to FIGS. 4 to 10.

Figure 2:
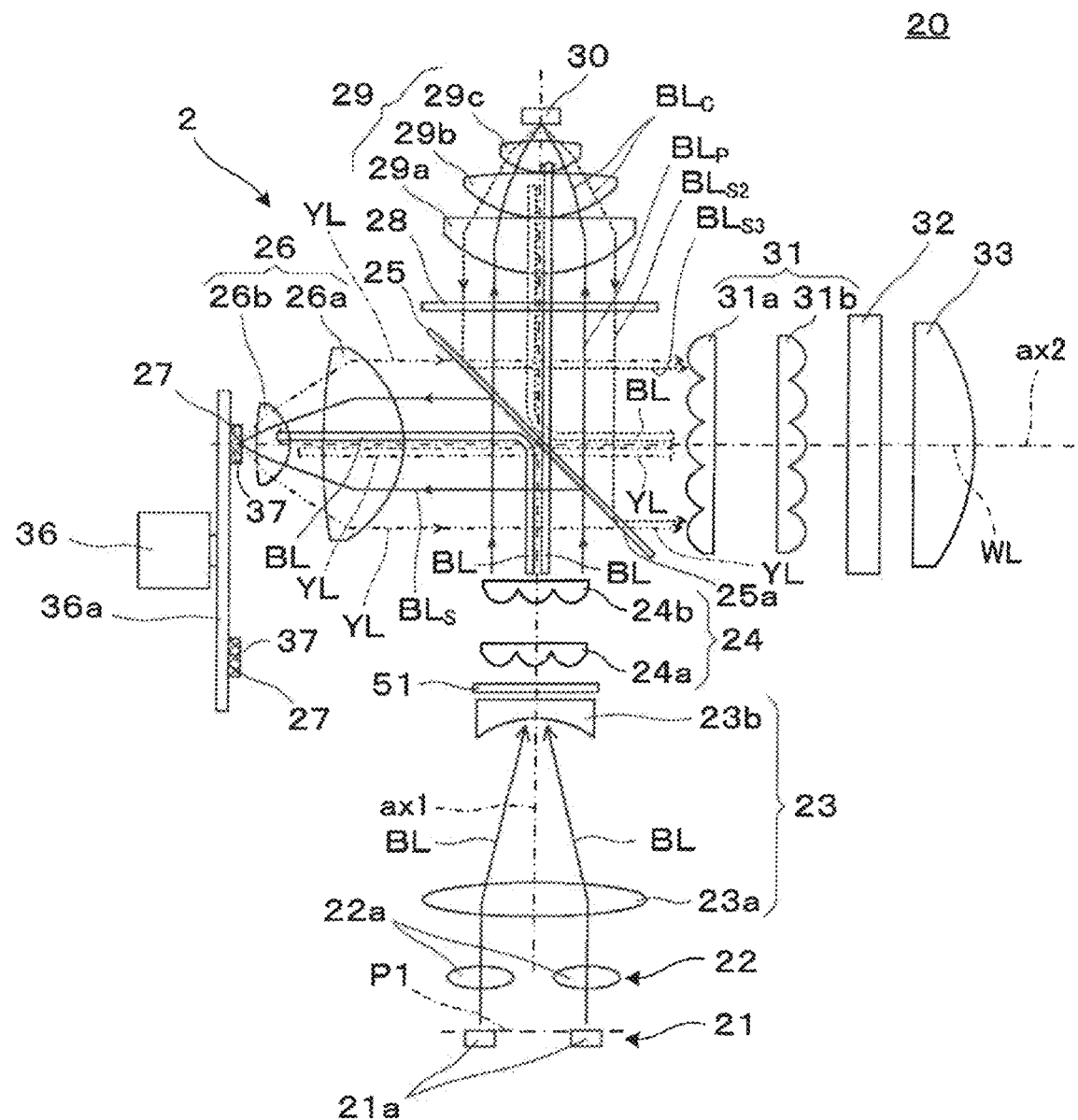
FIG. 2 is a schematic diagram illustrating the configuration of an illumination device including a light source device according to the embodiment.

The second condensing optical system according to Examples 6 to 9 is equivalent to the second condensing optical system 29 illustrated in FIG. 2. In these examples, the first pickup lens 29a is disposed at a position closest to the second phase difference element 28 inside the second condensing optical system 29. The third pickup lens 29c is disposed at a position closest to the diffusion reflection element 30 inside the second condensing optical system 29. In Examples 6 to 8, the first pickup lens 29a, the second pickup lens 29b, and the third pickup lens 29c are all quartz lenses. In Example 9, a glass material of the first pickup lens 29a is FCD515 made by HOYA rather than quartz, and the second pickup lens 29b and the third pickup lens 29c are both quartz lenses.

The second condensing optical system according to Examples 10 to 12 is configured to include the first pickup lens 29a that has positive power and a relatively large diameter and the second pickup lens 29b that has positive power and a relatively small diameter. In these examples, the first pickup lens 29a is disposed on a side of the second phase difference element 28 and the second pickup lens 29b is disposed on a side of the diffusion reflection element 30. The first pickup lens 29a and the second pickup lens 29b are quartz lenses.

Example 6

Figure 4:
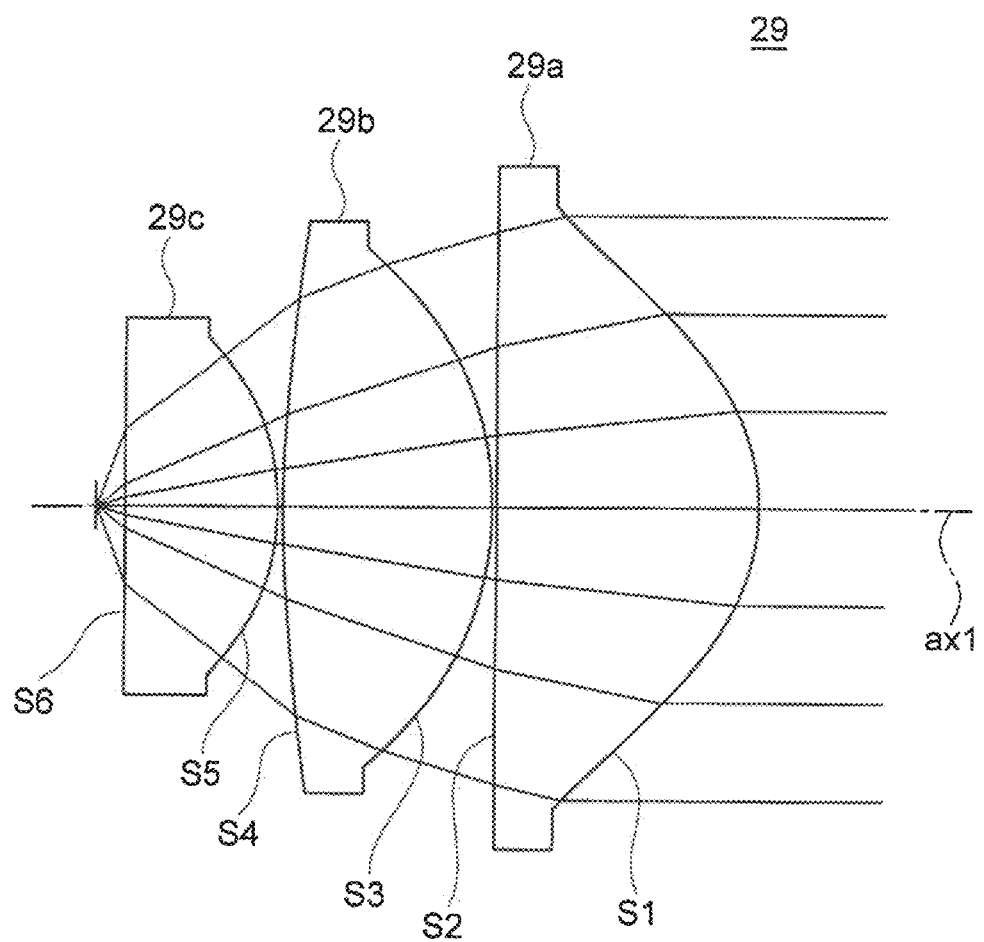
FIG. 4 is a sectional view illustrating one example of a condensing optical system.

FIG. 4 illustrates a second condensing optical system according to Example 6.

The first pickup lens 29a includes a first surface S1 which is an aspheric surface on the side of the second phase difference element 28. The first pickup lens 29a includes a second surface S2 on the side facing away from the second phase difference element 28. The second surface S2 is a convex curve surface (specifically, a spherical surface) with a radius of curvature of 1000 mm or more or a planar surface. The absolute value of a curvature of the first surface S1 is greater than the absolute value of a curvature of the second surface S2. A conic constant of the first surface S1 is negative.

Since the effective diameter of the first pickup lens 29a is large, the first surface S1 is preferably an aspheric surface in order to correct aberration.

The second pickup lens 29b includes a third surface S3 which is a convex spherical surface on the side of the second phase difference element 28 and includes a fourth surface S4 which is a convex spherical surface on the side facing away from the second phase difference element 28. The third surface S3 may be an aspheric surface.

The third pickup lens 29c includes a fifth surface S5 which is a spherical surface on the side of the second phase difference element 28. The third pickup lens 29c includes a sixth surface S6 on the side facing away from the second phase difference element 28. The sixth surface S6 is a convex curve surface (specifically, a spherical surface) with a radius of curvature of 1000 mm or more or a planar surface. The absolute value of a curvature of the fifth surface S5 is greater than the absolute value of a curvature of the sixth surface S6.

Example 7

Figure 5:
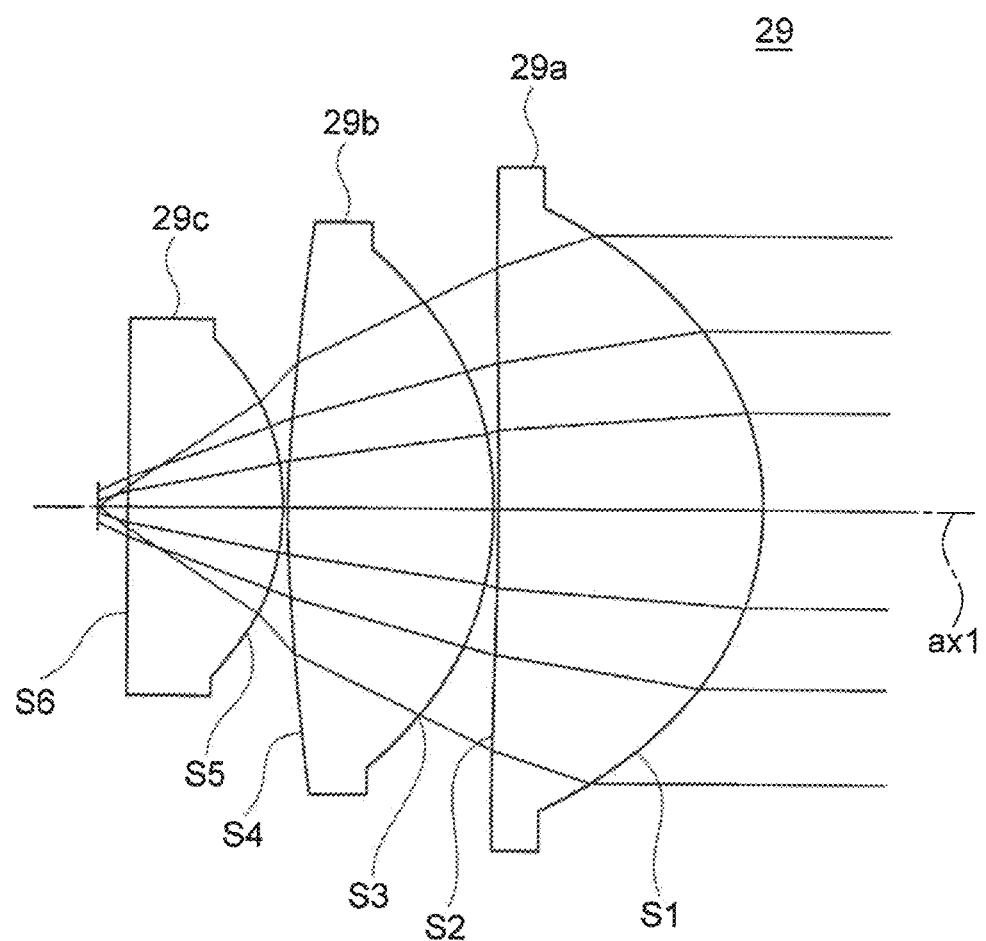
FIG. 5 is a sectional view illustrating another example of the condensing optical system.

FIG. 5 illustrates a second condensing optical system according to Example 7. This example is different from Example 6 in that the first surface S1 of the first pickup lens 29a is a spherical surface.

Example 8

Figure 6:
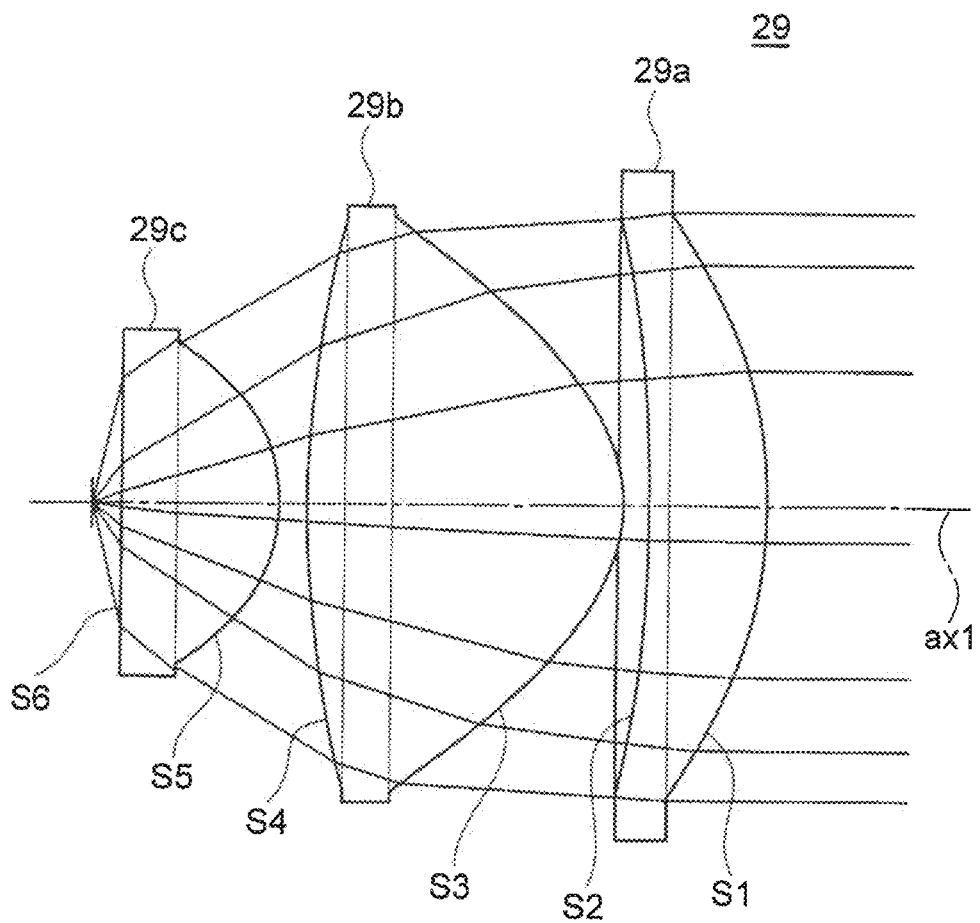
FIG. 6 is a sectional view illustrating still another example of the condensing optical system.

FIG. 6 illustrates a second condensing optical system according to Example 8. This example is different from Example 7 in that the second surface S2 of the first pickup lens 29a is a shallow concave spherical surface and the first surface S1 is an aspheric surface with a positive conic constant.

Example 9

Figure 7:
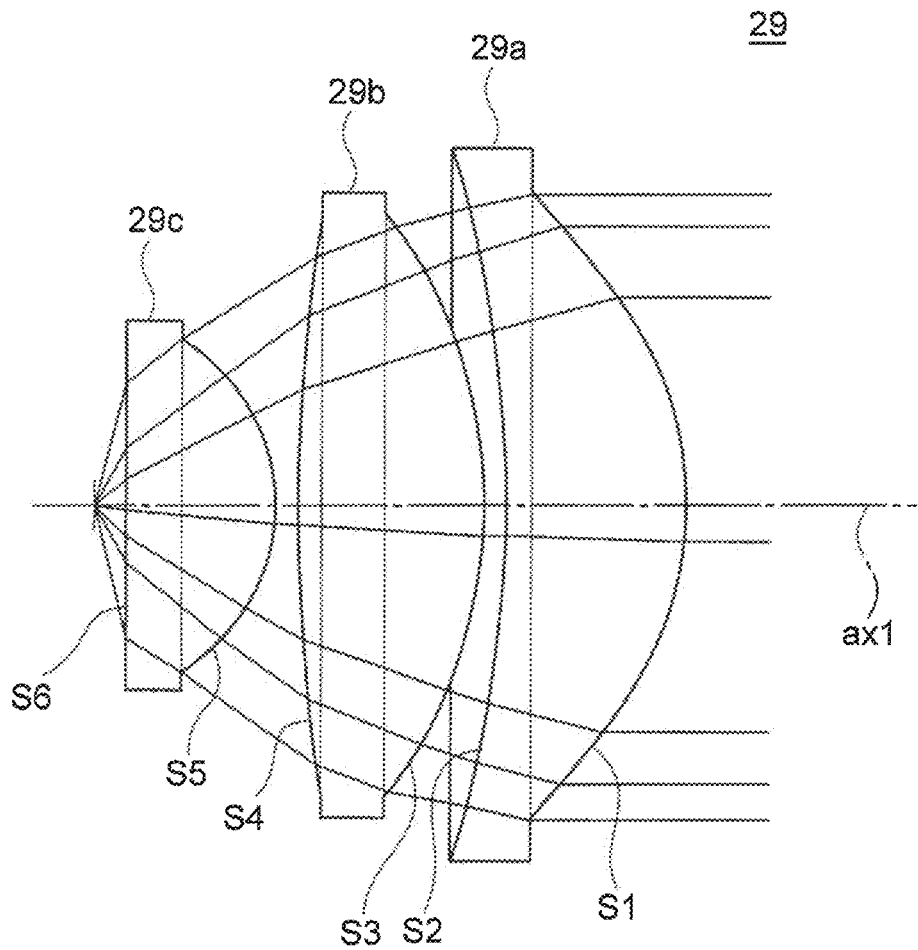
FIG. 7 is a sectional view illustrating still another example of the condensing optical system.

FIG. 7 illustrates a second condensing optical system according to Example 9.

The first pickup lens 29a includes a first surface S1 which is an aspheric surface on the side of the second phase difference element 28 and includes a second surface S2 which is a concave curve surface on the side facing away from the second phase difference element 28. The first surface S1 is an aspheric surface with a negative conic constant.

The second pickup lens 29b includes a third surface S3 which is a convex spherical surface on the side of the second phase difference element 28 and includes a fourth surface S4 which is a convex spherical surface on the side facing away from the second phase difference element 28. The absolute value of a curvature of the third surface S3 is greater than the absolute value of a curvature of the fourth surface S4.

The third pickup lens 29c includes a fifth surface S5 which is a spherical surface on the side of the second phase difference element 28 and includes a sixth surface S6 on the side facing away from the second phase difference element 28. The sixth surface S6 is a convex curve surface (specifically, a spherical surface) with a radius of curvature of 1000 mm or more or a planar surface. The absolute value of a curvature of the fifth surface S5 is greater than the absolute value of a curvature of the sixth surface S6.

Since the first pickup lens 29a is a typical optical glass, press processing can be applied to the first pickup lens 29a. The first pickup lens 29a can be easily processed even when the first pickup lens 29a is a meniscus lens. A glass material of the first pickup lens 29a is a material which is easily heated since internal absorptance is higher than fused quartz. However, as described above, the first pickup lens 29a is less likely to be heated since light density of light transmitted through the first pickup lens 29a is low. Further, the photoelastic constant of the first pickup lens 29a is considerably less than the photoelastic constant of the third pickup lens 29c. By decreasing the photoelastic constant of the first pickup lens 29a, it is possible to suppress occurrence of birefringence and further disturbance of polarization.

Example 10

Figure 8:
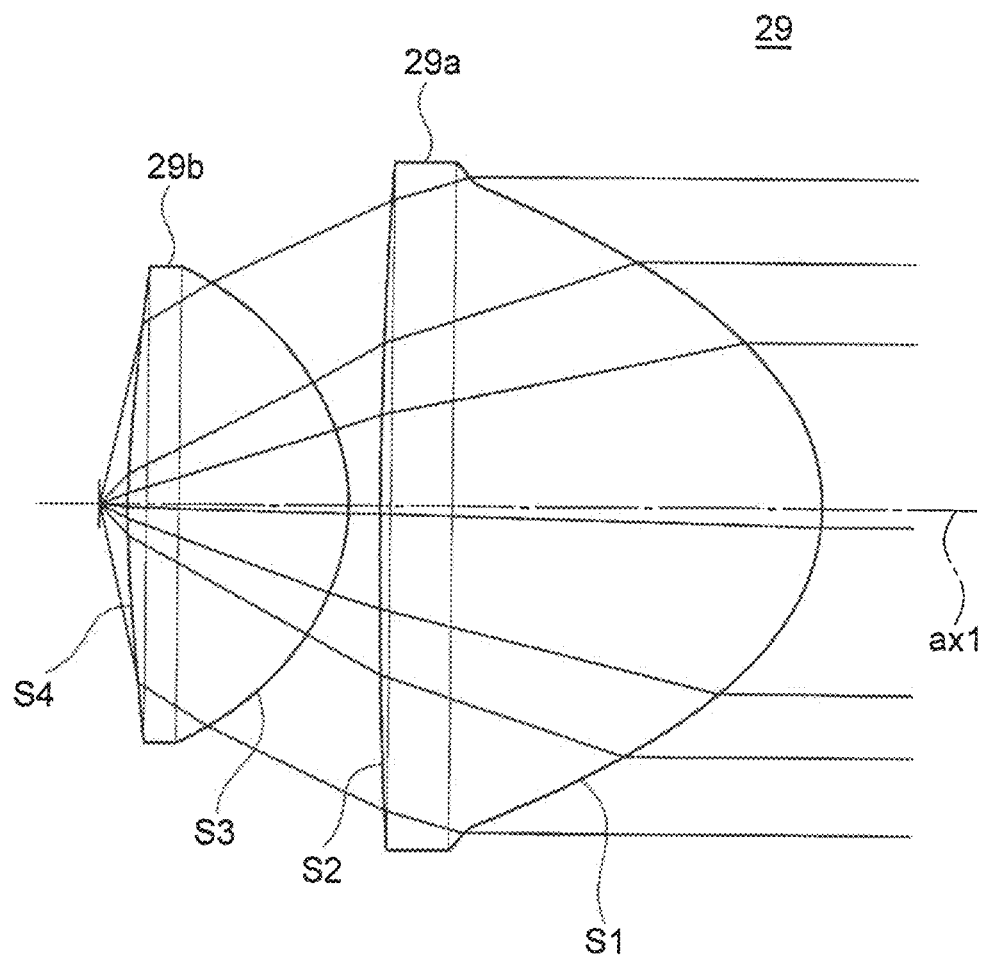
FIG. 8 is a sectional view illustrating still another example of the condensing optical system.

FIG. 8 illustrates a second condensing optical system according to Example 10. The first pickup lens 29a includes a first surface S1 which is an aspheric surface on the side of the second phase difference element 28 and includes a second surface S2 on the side facing away from the second phase difference element 28. The second surface S2 is a convex curve surface (specifically, a spherical surface) with a radius of curvature of 1000 mm or more or a planar surface. The absolute value of a curvature of the first surface S1 is greater than the absolute value of a curvature of the second surface S2. The first surface S1 is an aspheric surface with a negative conic constant.

The second pickup lens 29b includes a third surface S3 which is a spherical surface on the side of the second phase difference element 28 and includes a fourth surface S4 on the side facing away from the second phase difference element 28. The fourth surface S4 is a convex curve surface (specifically, a spherical surface) with a radius of curvature of 1000 mm or more or a planar surface. The absolute value of a curvature of the third surface S3 is greater than the absolute value of a curvature of the fourth surface S4. As in this example, the second condensing optical system can also be configured with two lenses.

Example 11

Figure 9:
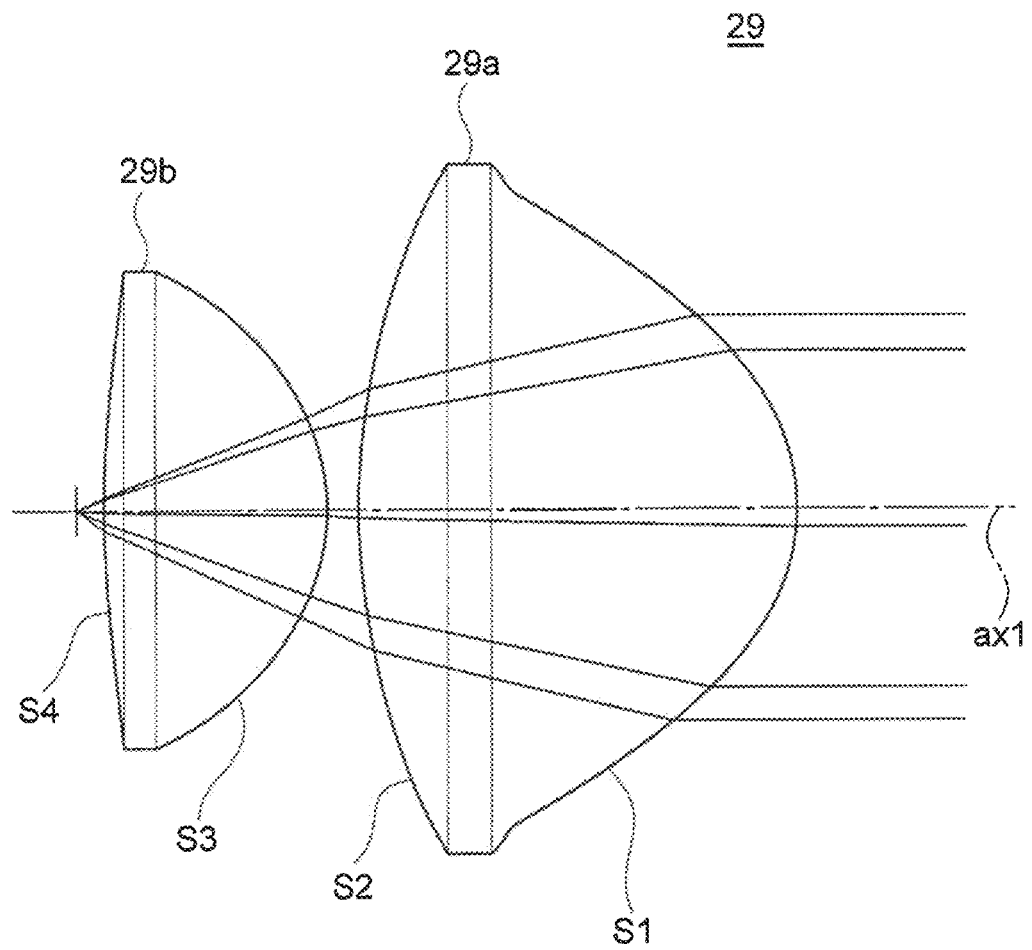
FIG. 9 is a sectional view illustrating still another example of the condensing optical system.

FIG. 9 illustrates a second condensing optical system according to Example 11. This example is different from Example 10 in that a second surface S2 of a first pickup lens 29a has a radius of curvature less than 1000 mm and is a convex curve surface with a relatively large protrusion amount. If the protrusion amount of the second surface S2 is considerably large, a gap between the first pickup lens 29a and the second pickup lens 29b is spread, and thus a diameter of the light incident on the first pickup lens 29a from the second pickup lens 29b increases. To capture the incident light, it is necessary to increase the first pickup lens 29a. Accordingly, the radius of curvature of the second surface S2 is preferably large as in Example 10.

Example 12

Figure 10:
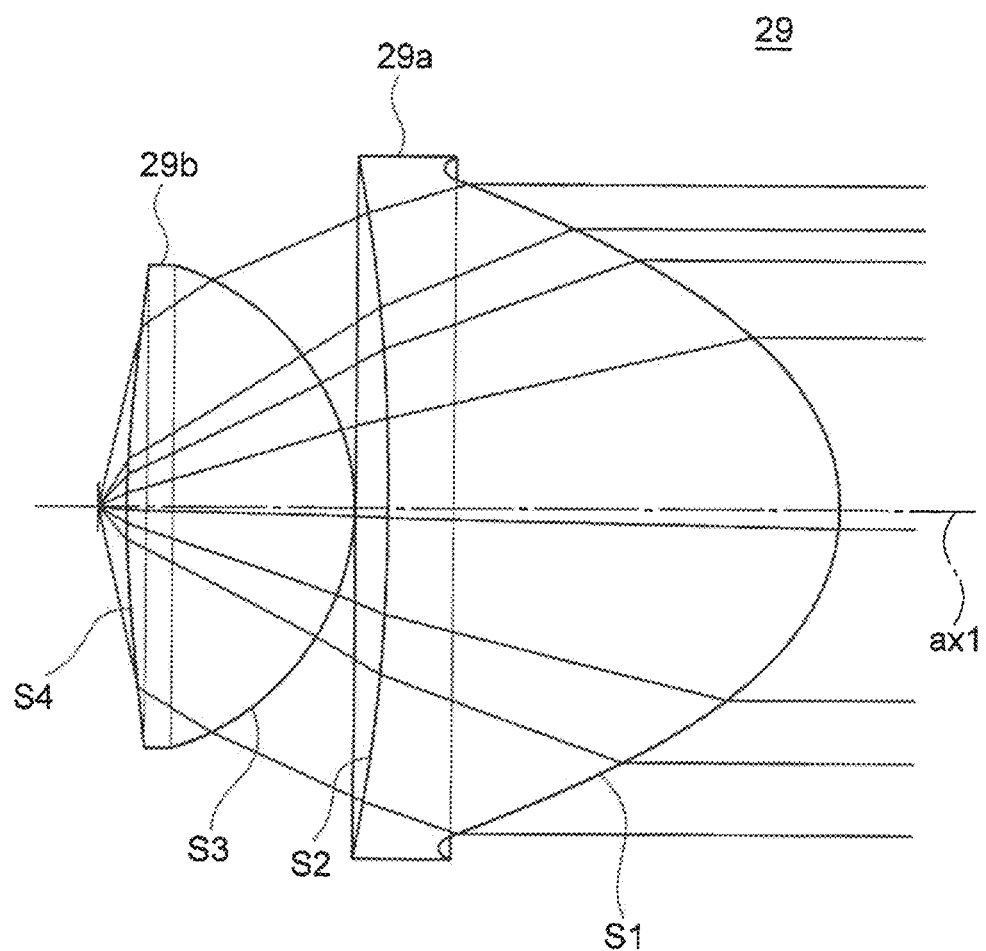
FIG. 10 is a sectional view illustrating still another example of the condensing optical system.

FIG. 10 illustrates a second condensing optical system according to Example 12.

This example is different from Example 10 in that a second surface S2 of a first pickup lens 29a is a shallow concave spherical surface.

In the above-described light source device 2, the blue light $BL_C$ is reflected by the diffusion reflection element 30 to make a round trip in the second condensing optical system 29. However, the second condensing optical system 29 includes the quartz lens. Therefore, even when a strong laser light is transmitted through the second condensing optical system 29, large birefringence is less likely to occur. Thus, it is possible to suppress a decrease in the blue S-polarized light BLS3 and improve the use efficiency of the blue light BL.

The invention has been described according to the embodiment, but the invention is not limited to the foregoing embodiment and can be implemented in various forms within the scope of the invention without departing from the gist of the invention. For example, the following modifications can also be made.

In the foregoing embodiment, the blue light $BL_C$ travels toward the polarization separation element 25 and is reflected by the diffusion reflection element 30 to be combined with the fluorescent light YL, but the invention is not limited thereto. For example, a laser light emitted from the semiconductor laser 21a may be incident obliquely on the diffusion reflection element 30 and the laser light diffused and reflected by the diffusion reflection element 30 may be captured by a different pickup optical system (condensing optical system) from the second condensing optical system 29.

In the foregoing embodiment, the reflective diffusion reflection element has been used as an optical element. The invention can also be applied even when laser light can be diffused using a transmissive diffusion element as an optical element. In this case, at least one of the condensing optical system for condensing laser light on the diffusion element and the pickup optical system for capturing diffused light emitted from the diffusion element may include at least one quartz lens. Thus, since disturbance of polarization by the diffusion element can be decreased, it is possible to reduce loss of the diffused light on a rear stage.

Figure 11:
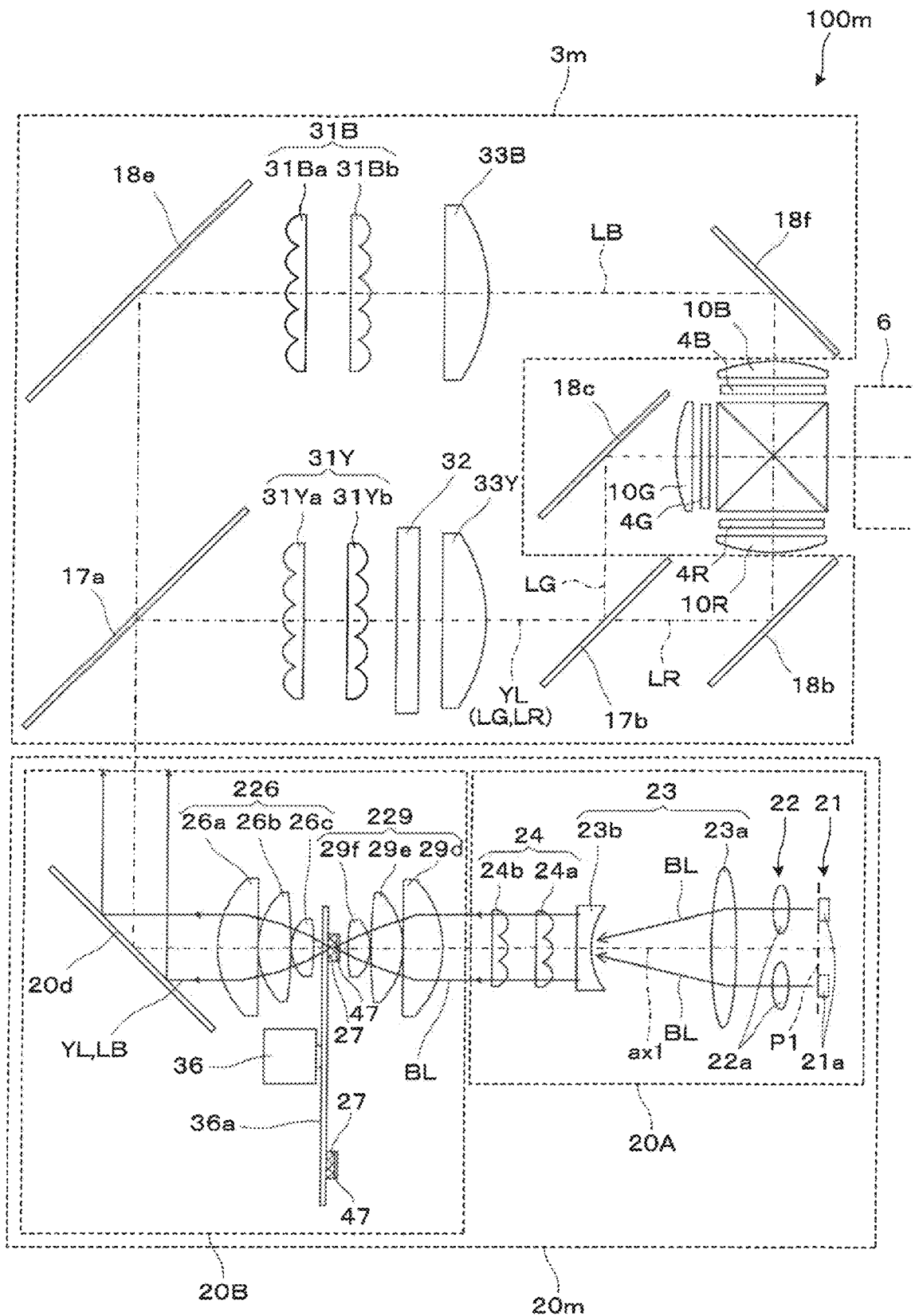
FIG. 11 is a conceptual diagram illustrating a configuration of a projector according to a modification example.

FIG. 11 is a diagram illustrating a projector 100m configured using a transmissive diffusion element or an optical element according to a modification example. The projector 100m illustrated in FIG. 11 is different from the projector 100 illustrated in FIG. 1 in structures of an illumination device 20m and a color separation optical system 3m. The same reference numerals are given to common configurations and members to the projector 100 and the description thereof will not be made or will be simplified.

The illumination device 20m includes a light-emitting unit 20A and an illumination light forming unit 20B. The illumination device 20m functions as a light source device.

The light-emitting unit 20A includes an array light source 21, a collimator optical system 22, an afocal optical system 23, and a homogenizer optical system 24.

The illumination light forming unit 20B includes a condensing optical system 229, a phosphor layer 27, and a pickup optical system 226.

The entire blue light BL emitted from the light-emitting unit 20A is incident on the condensing optical system 229 as a first component described in the claims. The condensing optical system 229 condenses the blue light BL toward the phosphor layer 27. The condensing optical system 229 homogenizes the distribution of illuminance by the blue light BL on the phosphor layer 27 in cooperation with the homogenizer optical system 24.

The condensing optical system 229 includes one or more lenses and includes a lens formed of quartz. In the modification example, synthetic quartz is used. Since the synthetic quartz has high optical uniformity than fused quartz, internal absorptance is less than that of the fused quartz. Accordingly, the synthetic quartz is preferable. Specifically, the condensing optical system 229 includes a first lens 29d that has positive power and a relatively large diameter, a second lens 29e that has positive power, and a third lens 29f that has positive power and a relatively small diameter. The first lens 29d is disposed at a farthest position from the phosphor layer 27 inside the condensing optical system 229. The third lens 29f is disposed at a closest position to the phosphor layer 27 inside the condensing optical system 229. The blue light BL for excitation incident on the condensing optical system 229 is condensed on the phosphor layer 27 which is a wavelength conversion element.

The number of lenses included in the condensing optical system 229 is not limited to 3, as in the illustration. For example, the condensing optical system 229 can be configured with a single lens.

The phosphor layer 27 functions as a transmissive diffusion element that diffuses the blue light BL. As in the case illustrated in FIG. 2, the phosphor layer 27 is provided in a circular shape on the board 36a rotated by the rotation mechanism 36. The phosphor layer 27 converts the blue light BL with the wavelength of 455 nm which is excited light into fluorescent light (yellow light) YL with a peak wavelength in a wavelength bandwidth of, for example, 500 to 700 nm and emits the fluorescent light YL.

The board 36a has light transmissivity. No reflection unit is provided on the side of the board 36a of the phosphor layer 27. Instead, a dichroic film 47 that transmits the blue light BL and reflects the fluorescent light YL is provided on the side of the phosphor layer 27 facing away from the board 36a. Accordingly, of the blue light BL, a component which is not converted into the fluorescent light by a phosphor in the phosphor layer 27 passes through the phosphor layer 27 to be emitted as the blue light LB toward the pickup optical system 226. The fluorescent light YL is reflected by the dichroic film 47 to be emitted toward the pickup optical system 226. In this way, illumination light formed by the blue light LB and the fluorescent light YL is emitted from the illumination device 20m.

The pickup optical system 226 is disposed on the side of the phosphor layer 27 facing away from the condensing optical system 229. The pickup optical system 226 is configured to include one or more lenses and includes a lens formed of fused quartz. Specifically, the pickup optical system 226 includes a first pickup lens 26a that has positive power and a relatively large diameter, a second pickup lens 26b that has positive power, and a third pickup lens 26c that has positive power and a relatively small diameter. The first pickup lens 26a is disposed at a farthest position from the phosphor layer 27 inside the pickup optical system 226. The third pickup lens 26c is disposed at a closest position to the phosphor layer 27 inside the pickup optical system 226. The blue light LB and the fluorescent light YL incident on the pickup optical system 226 are incident on a total reflection mirror 20d in a collimated state.

The number of lenses included in the pickup optical system 226 is not limited to 3.

In the color separation optical system 3m, the illumination light from the illumination device 20m is branched into the blue light LB and the fluorescent light YL by a first dichroic mirror 17a. The fluorescent light YL reflected from the first dichroic mirror 17a is branched into the red light LR and the green light LG by a second dichroic mirror 17b. The red light LR, the green light LG, and the blue light LB are guided by total reflection mirrors 18b, 18c, 18e, and 18f to illuminate the light modulation devices 4R, 4G, and 4B.

To homogenize the fluorescent light YL, an integrator optical system 31Y and a superimposing optical system 33Y are disposed on a light path of the fluorescent light YL. The integrator optical system 31Y is configured to include, for example, a lens array 31Ya and a lens array 31Yb. Further, the polarization conversion element 32 that converts the fluorescent light YL into linearly polarized light is disposed. To homogenize the blue light LB, an integrator optical system 31B and a superimposing optical system 33B are disposed on a light path of the blue light LB. The integrator optical system 31B is configured to include, for example, a lens array 31Ba and a lens array 31Bb.

Since the light-emitting unit 20A includes a semiconductor laser 21a, the blue light BL is linearly polarized light. The condensing optical system 229 and the pickup optical system 226 each include the quartz lens. Therefore, even when the blue light BL is strong laser light, large birefringence is less likely to occur in the condensing optical system 229 or the pickup optical system 226. Therefore, the polarization state of the blue light BL is considerably maintained even when the blue light BL is transmitted through the condensing optical system 229. Further, most of the polarization state of the blue light LB is maintained even when the blue light LB is transmitted through the condensing optical system 226. Accordingly, even when no polarization conversion element is included in regard to the blue light LB, the blue light LB can be used with high efficiency. Although the detailed description is not made, the specifications of the integrator optical system 31Y and the superimposing optical system 33Y are different from the specifications of the integrator optical system 31B and the superimposing optical system 33B. This is because divergence of the blue light LB is considerably smaller than that of the fluorescent light YL.

The condensing optical system 229 and the pickup optical system 226 may each adopt the optical configuration exemplified in any one of Examples 1 to 11 described above.

In the foregoing embodiment, the example in which the light source device according to the invention is mounted on the projector in which a liquid crystal light valve is used has been described, but the invention is not limited thereto. The light source device according to the invention may be mounted on the projector which uses a digital micro-mirror device serving as a light modulation device. By causing the blue light LB to be incident on the reflection mirror as the S-polarized light, it is possible to reduce loss of the blue light LB by the reflection mirror.

In the foregoing embodiment, the example in which the light source device according to the invention is mounted on the projector has been described, but the invention is not limited thereto. The light source device according to the invention can also be applied to a head light of illumination equipment or an automobile.

In the foregoing modification example, by replacing the phosphor layer 27 with a transmissive diffusion element including no phosphor, it is possible to obtain illumination light formed by the blue light LB. Even in this case, it is not necessary to provide a polarization conversion element in regard to the blue light LB. In a case in which color light with another color is necessary in addition to the blue light LB, another illumination device emitting color light with red or green may be separately provided.

In the foregoing example, blue light is emitted from the light emission element and the yellow fluorescent light YL is generated. However, any color of each piece of light can be used.

The entire disclosure of Japanese Patent Application No.: 2015-045585, filed on Mar. 9, 2015 and 2015-241842, filed on Dec. 11, 2015 are expressly incorporated by reference herein.

What is claimed is:

1. A light source device comprising:
a light emission element;
a polarization separation element on which a light emitted from the light emission element is incident, and that separates the light into a first component of light polarized in a first direction and a second component of light polarized in a second direction perpendicular to the first direction;
a phase difference element on which the first component of light is incident, and that converts the first component of light to a circularly polarized light;
a condensing optical system on which the circularly polarized light is incident;
an optical element on which the circularly polarized light transmitted through the condensing optical system is incident, wherein
the polarization separation element is provided on a light path between the light emission element and the condensing optical system,
the phase difference element is provided on a light path between the polarization separation element and the condensing optical system,
the optical element includes a reflection surface from which the circularly polarized light is reflected,
the circularly polarized light reflected from the reflection surface is incident on the condensing optical system,
the circularly polarized light transmitted through the condensing optical system is incident on the phase difference element, and that is converted to a third component of light polarized in the second direction,
the third component of light is incident on the polarization separation element,
the condensing optical system includes a first lens and a second lens, the first lens being formed of quartz,
the first lens is disposed at a position closest to the phase difference element in the condensing optical system,
the first lens has an aspheric surface with a negative conic constant on a side of the phase difference element,
the first lens has a curve surface with a radius of curvature of 1000 mm or more or a planar surface on a side facing away from the phase difference element, and
an absolute value of a curvature of the aspheric surface is greater than an absolute value of a curvature of the curve surface or the planar surface.

2. The light source device according to claim 1, wherein the condensing optical system further includes a fourth lens,
the fourth lens is disposed between the first lens and the second lens, and
the fourth lens is formed of quartz.

3. A projector comprising:
the light source device according to claim 1;
a light modulation device that modulates light emitted from the light source device, in accordance with image information, to form image light; and
a projection optical system that projects the image light.

4. A light source device comprising:
a light emission element;
a polarization separation element on which a light emitted from the light emission element is incident, and that separates the light into a first component of light polarized in a first direction and a second component of light polarized in a second direction perpendicular to the first direction;
a phase difference element on which the first component of light is incident, and that converts the first component of light to a circularly polarized light;
a condensing optical system on which the circularly polarized light is incident;
an optical element on which the circularly polarized light transmitted through the condensing optical system is incident, wherein
the polarization separation element is provided on a light path between the light emission element and the condensing optical system,
the phase difference element is provided on a light path between the polarization separation element and the condensing optical system,
the optical element includes a reflection surface from which the circularly polarized light is reflected,
the circularly polarized light reflected from the reflection surface is incident on the condensing optical system,
the circularly polarized light transmitted through the condensing optical system is incident on the phase difference element, and that is converted to a third component of light polarized in the second direction,
the third component of light is incident on the polarization separation element,
the condensing optical system includes a first lens and a third lens, the first lens being formed of quartz,
the first lens is disposed at a position closest to the optical element in the condensing optical system,
the third lens is disposed at a position closest to the base difference element in the condensing optical system, and
a photoelastic constant of the third lens is less than a photoelastic, constant of the first lens.

5. The light source device according to claim 4, wherein the third lens has an aspheric surface with a negative conic constant on a side of the phase difference element.

6. The light source device according to claim 4, wherein the condensing optical system further includes a fifth lens,
the fifth lens is disposed between the first lens and the third lens, and
the fifth lens is formed of quartz.

7. A projector comprising:
the light source device according to claim 4;
a light modulation device that modulates light emitted from the light source device, in accordance with image information, to form image light; and
a projection optical system that projects the image light.

8. A light source device comprising:
a light emission element;
a polarization separation element on which a light emitted from the light emission element is incident, and that separates the light into a first component of light polarized in a first direction and a second component of light polarized in a second direction perpendicular to the first direction;

a phase difference element on which the first component of light is incident, and that converts the first component of light to a circularly polarized light;

a condensing optical system on which the circularly polarized light is incident;

an optical element on which the circularly polarized light transmitted through the condensing optical system is incident, wherein the polarization separation element is provided on a light path between the light emission element and the condensing optical system, the phase difference element is provided on a light path between the polarization separation element and the condensing optical system, the optical element includes a reflection surface from which the circularly polarized light is reflected, the circularly polarized light reflected from the reflection surface is incident on the condensing optical system, the circularly polarized light transmitted through the condensing optical system is incident on the phase difference element, and that is converted to a third component of light polarized in the second direction, the third component of light is incident on the polarization separation element, the condensing optical system includes a first lens and a second lens, the first lens being formed of quartz, the first lens is disposed at a position closest to the phase difference element in the condensing optical system, the second lens is disposed at a position closest to the optical element in the condensing optical system, the second lens is formed of quartz, the second lens has a curve surface with a radius of curvature of 1000 mm or more or a planar surface on a side of the optical element, the second lens has a spherical surface on a side facing away from the optical element, and an absolute value of a curvature of the spherical surface is greater than an absolute value of a curvature of the curve surface or the planar surface.

9. The light source device according to claim 8, wherein the condensing optical system further includes a fourth lens, the fourth lens is disposed between the first lens and the second lens, and the fourth lens is formed of quartz.

10. A light source device comprising:

a light emission element;

a polarization separation element on which a light emitted from the light emission element is incident, and that separates the light into a first component of light polarized in a first direction and a second component of light polarized in a second direction perpendicular to the first direction;

a phase difference element on which the first component of light is incident, and that converts the first component of light to a circularly polarized light;

a condensing optical system on which the circularly polarized light is incident;

an optical element on which the circularly polarized light transmitted through the condensing optical system is incident, wherein the polarization separation element is provided on a light path between the light emission element and the condensing optical system, the phase difference element is provided on a light path between the polarization separation element and the condensing optical system, the optical element includes a reflection surface from which the circularly polarized light is reflected, the circularly polarized light reflected from the reflection surface is incident on the condensing optical system, the circularly polarized light transmitted through the condensing optical system is incident on the phase difference element, and that is converted to a third component of light polarized in the second direction, the third component of light is incident on the polarization separation element, the condensing optical system includes a first lens and a third lens, the first lens being formed of quartz, the first lens is disposed at a position closest to the optical element in the condensing optical system, the first lens has a curve surface with a radius of curvature of 1000 mm or more or a planar surface on a side of the optical element, the first lens has a spherical surface on a side facing away from the optical element, and an absolute value of a curvature of the spherical surface is greater than an absolute value of a curvature of the curve surface or the planar surface.

11. The light source device according to claim 10, wherein the condensing optical system further includes a fifth lens, the fifth lens is disposed between the first lens and the third lens, and the fifth lens is formed of quartz.

12. A projector comprising:

the light source device according to claim 8;

a light modulation device that modulates light emitted from the light source device, in accordance with image information, to form image light; and a projection optical system that projects the image light.

13. A projector comprising:

the light source device according to claim 10;

a light modulation device that modulates light emitted from the light source device, in accordance with image information, to form image light; and a projection optical system that projects the image light.

* * * * *